United States Patent
Kuramochi et al.

(10) Patent No.: US 11,797,261 B2
(45) Date of Patent: Oct. 24, 2023

(54) ON-VEHICLE DEVICE, METHOD OF CONTROLLING ON-VEHICLE DEVICE, AND STORAGE MEDIUM

(71) Applicant: HONDA MOTOR CO., LTD., Tokyo (JP)

(72) Inventors: Toshikatsu Kuramochi, Tokyo (JP); Mototsugu Kubota, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 518 days.

(21) Appl. No.: 16/820,755

(22) Filed: Mar. 17, 2020

(65) Prior Publication Data

US 2020/0301654 A1  Sep. 24, 2020

(30) Foreign Application Priority Data

Mar. 19, 2019 (JP) ................................ 2019-051019

(51) Int. Cl.
*G10L 15/30* (2013.01)
*G06F 3/16* (2006.01)
(Continued)

(52) U.S. Cl.
CPC ............. *G06F 3/165* (2013.01); *G06F 3/167* (2013.01); *G10L 15/22* (2013.01); *G10L 15/30* (2013.01); *G10L 15/222* (2013.01); *H04W 4/44* (2018.02)

(58) Field of Classification Search
CPC . G06F 3/165; G06F 3/16; G06F 3/167; G10L 15/30; G10L 15/222;
(Continued)

(56) References Cited

U.S. PATENT DOCUMENTS

2003/0032419 A1* 2/2003 Shibasaki ......... H04M 1/72412
455/419
2004/0176959 A1* 9/2004 Wilhelm ............. B60R 16/0373
704/275
(Continued)

FOREIGN PATENT DOCUMENTS

CN  102801436  11/2012
CN  102959617  3/2013
(Continued)

OTHER PUBLICATIONS

Chinese Office Action for Chinese Patent Application No. 202010189240.6 dated Jun. 29, 2023.

*Primary Examiner* — Huyen X Vo
(74) *Attorney, Agent, or Firm* — AMIN, TUROCY & WATSON, LLP

(57) ABSTRACT

An on-vehicle device includes: a plurality of agent function units configured to provide services including causing an output unit to output an audio response in response to an utterance of an occupant of a vehicle; and a content management unit configured to determine whether or not the instructed content is stored in an in-vehicle storage device mounted in the vehicle or a portable storage medium brought into the vehicle when the playback of the content is instructed by the utterance of the occupant, and to cause the playback device to play back the content present in the in-vehicle storage device or the portable storage medium when the instructed content is determined as being stored in the in-vehicle storage device or the portable storage medium.

7 Claims, 8 Drawing Sheets

(51) Int. Cl.
*G10L 15/22* (2006.01)
*H04W 4/44* (2018.01)

(58) Field of Classification Search
CPC ..... G10L 15/1822; G10L 15/18; G10L 25/78;
G10L 2015/088; G10L 15/08; G10L
2015/223; G10L 15/22; G10L 5/222;
H04W 4/44; H04M 9/10
See application file for complete search history.

(56) References Cited

U.S. PATENT DOCUMENTS

| | | |
|---|---|---|
| 2013/0096921 A1 | 4/2013 | Kuwamoto et al. |
| 2017/0118580 A1 | 4/2017 | Tian |
| 2017/0168774 A1* | 6/2017 | Sugita ................... G06F 3/0481 |
| 2018/0077712 A1 | 3/2018 | Carneval et al. |
| 2020/0342863 A1* | 10/2020 | Aggarwal ............... G10L 15/26 |

FOREIGN PATENT DOCUMENTS

| | | |
|---|---|---|
| CN | 105898674 | 8/2016 |
| CN | 109357681 | 2/2019 |
| JP | 2006-335231 | 12/2006 |

\* cited by examiner

ON-VEHICLE DEVICE, METHOD OF CONTROLLING ON-VEHICLE DEVICE, AND STORAGE MEDIUM

CROSS-REFERENCE TO RELATED APPLICATION

Priority is claimed on Japanese Patent Application Nos. 2019-051019, filed Mar. 19, 2019, the content of which is incorporated herein by reference.

BACKGROUND OF THE INVENTION

Field of the Invention

The present invention relates to an on-vehicle device, a method of controlling an on-vehicle device, and a storage medium.

Description of Related Art

Conventionally, a technique related to an agent function for providing information on driving assistance, control of a vehicle, and other applications in response to a request from an occupant while interacting with the occupant of the vehicle has been disclosed (for example, see Japanese Unexamined Patent Application, First Publication No. 2006-335231).

SUMMARY OF THE INVENTION

In recent years, practical use of mounting a plurality of agent functions in a vehicle has been promoted. However, there is a problem that one agent function monopolizes a system for a long time and other agent functions cannot be used, which has not been sufficiently studied. For this reason, in a conventional technique, when other agent functions cannot be used, effort such as manual operation by an occupant may be expended.

Aspects of the present invention have been made in view of such circumstances, and an object of the present invention is to provide an on-vehicle device, a method of controlling an on-vehicle device, and a storage medium, in which convenience can be improved.

In order to solve the problem described above and achieve the object, the present invention employs the following aspects.

(1) An on-vehicle device according to one aspect of the present invention includes: a plurality of agent function units configured to provide services including causing an output unit to output an audio response in response to an utterance of an occupant of a vehicle, at least some of the agent function units providing a service of acquiring content from a server device outside the vehicle via wireless communication and causing a playback device to play back the content in response to the utterance of the occupant; and a content management unit configured to determine whether or not the instructed content is stored in an in-vehicle storage device mounted in the vehicle or a portable storage medium brought into the vehicle when the playback of the content is instructed by the utterance of the occupant, and to cause the playback device to play back the content present in the in-vehicle storage device or the portable storage medium when the instructed content is determined as being stored in the in-vehicle storage device or the portable storage medium.

(2) In the above aspect (1), when the content management unit determines that the instructed content is not stored in the in-vehicle storage device or the portable storage medium, one of the plurality of agent function units may acquire the instructed content from the server device and cause the playback device to play back the acquired content.

(3) In the above aspect (1) or (2), among the plurality of agent function units, an agent function unit to which authority for controlling vehicle devices mounted in the vehicle is assigned may cause the playback device to play back the instructed content.

(4) In the above aspects (1) to (3), when the content management unit determines that the instructed content is stored in the in-vehicle storage device or the portable storage medium, an active agent function unit of the plurality of agent function units may stop functioning.

(5) In the above aspect (4), among the plurality of agent function units, an agent function unit to which authority for controlling vehicle devices mounted in the vehicle is assigned or an activation control unit which controls activation of the plurality of agent function units may cause the active agent function unit of the plurality of agent function units to stop functioning.

(6) In the above aspects (1) to (5), an initiative setting unit configured to set an initiative which is authority to exclusively provide a service via an agent to any of the plurality of agent function units is further provided, and when the instructed content is determined as being present in the in-vehicle storage device or the portable storage medium, the initiative setting unit may set the initiative to the agent function unit to which authority for controlling the vehicle devices mounted in the vehicle is assigned.

(7) A method of controlling an on-vehicle device according to one aspect of the present invention is a method in which a computer executes steps of: causing a plurality of agents to virtually appear, the plurality of agents providing services including causing an output unit to output an audio response in response to an utterance of an occupant of a vehicle, at least some of the agents providing a service of acquiring content from a server device outside the vehicle via wireless communication and causing a playback device to play back the content in response to the utterance of the occupant; determining whether or not the instructed content is stored in an in-vehicle storage device mounted in the vehicle or a portable storage medium brought into the vehicle when the playback of the content is instructed by the utterance of the occupant; and causing the playback device to play back the content present in the in-vehicle storage device or the portable storage medium when the instructed content is determined as being stored in the in-vehicle storage device or the portable storage medium.

(8) A non-transitory computer-readable storage medium according to one aspect of the present invention stores a program which causes a computer to execute processes of: causing a plurality of agents to virtually appear, the plurality of agents providing services including causing an output unit to output an audio response in response to an utterance of an occupant of a vehicle, at least some of the agents providing a service of acquiring content from a server device outside the vehicle via wireless communication and causing a playback device to play back the content in response to the utterance of the occupant; determining whether or not the instructed content is stored in an in-vehicle storage device mounted in the vehicle or a portable storage medium brought into the vehicle when the playback of the content is instructed by the utterance of the occupant; and causing the playback device to play back the content present in the in-vehicle storage device or the portable storage medium when the instructed content is determined as being stored in the in-vehicle storage device or the portable storage medium.

According to the aspects of the present invention, convenience can be improved.

DETAILED DESCRIPTION OF THE INVENTION

Hereinafter, an embodiment of an on-vehicle device, a method of controlling an on-vehicle device, and a storage medium according to the present invention will be described with reference to the drawings. The on-vehicle device includes an agent device. The on-vehicle device may be the agent device itself. The agent device is a device for realizing a part or all of an agent system. Hereinafter, as an example of the agent device, an agent device which is mounted in a vehicle (hereinafter, a vehicle M) and has a plurality of types of agent functions will be described. The agent functions are, for example, functions of providing various information based on a request (a command) included in an utterance of an occupant and mediating a network service while interacting with the occupant of the vehicle M. A plurality of types of agents may each have different functions, processing procedures, controls, and output modes and content. The agent functions may include a function of controlling devices in the vehicle (for example, devices related to driving control and vehicle body control).

The agent functions are realized by, for example, integrally using a natural language processing function (a function of understanding a structure and a meaning of text), a conversation management function, a network search function of searching other devices via a network, or searching a predetermined database owned by the device itself, etc., in addition to a voice recognition function of recognizing a voice of the occupant (a function of converting a voice to text). Some or all of these functions may be realized by artificial intelligence (AI) technology. Some constituents for performing these functions (particularly, the voice recognition function and a natural language processing and interpretation function) may be installed in an agent server (an external device) which can communicate with an on-vehicle communication device of the vehicle M or a general-purpose communication device brought into the vehicle M. The following description will be made on the premise that some of the constituents are installed in the agent server, and the agent device and the agent server cooperate to realize the agent system. A service providing entity (a service entity) that the agent device and the agent server cause to virtually appear in cooperation is referred to as an agent.

<Overall Configuration>

Figure 1:
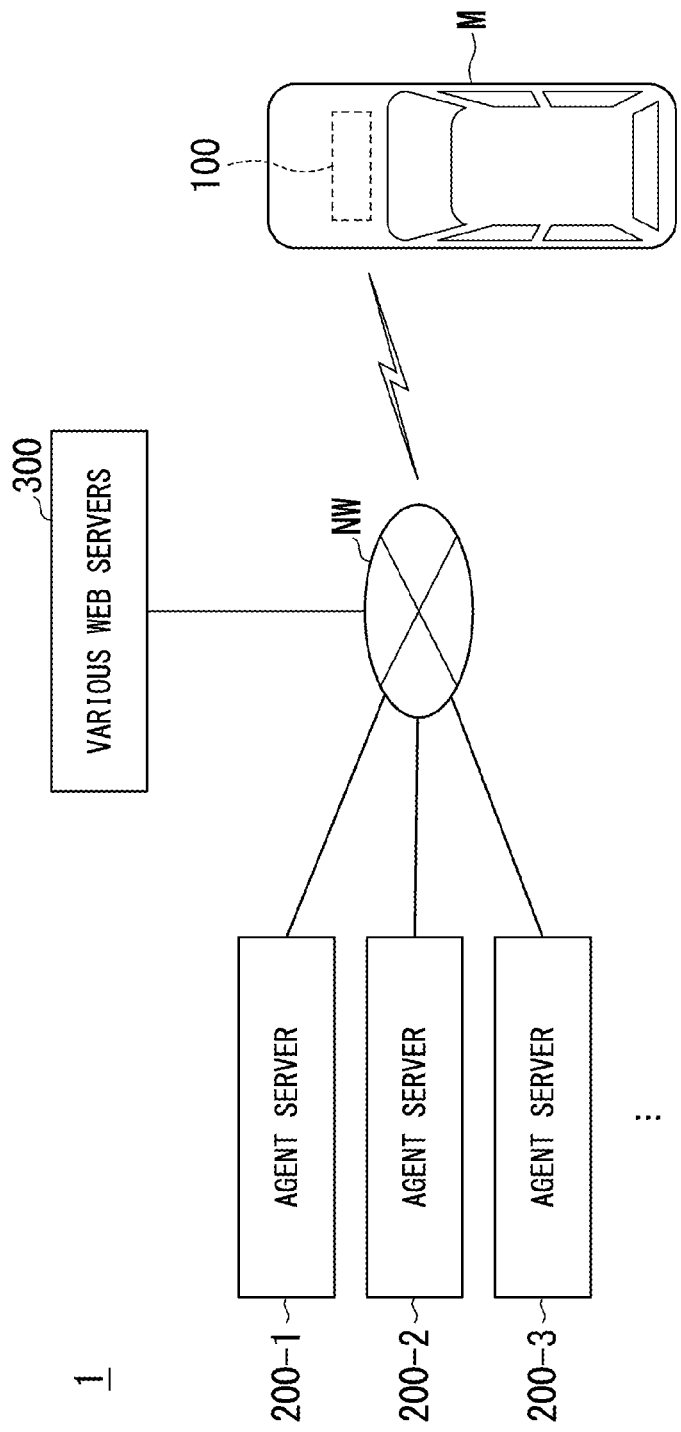
FIG. 1 is a configuration diagram of an agent system including an agent device.

FIG. 1 is a configuration diagram of an agent system 1 including an agent device 100. The agent system 1 includes, for example, the agent device 100 and a plurality of agent servers 200-1, 200-2, 200-3, . . . . Numbers following hyphens at endings of the reference signs are identifiers for distinguishing respective agents. When it is unnecessary to distinguish which agent server is referred to, the agent servers may be simply referred to as an agent server 200. Although three agent servers 200 are shown in FIG. 1, the number of the agent servers 200 may be two or four or more. Each agent server 200 is operated by a provider of a different agent system. Therefore, the agents in the present invention are agents realized by different providers. Examples of the provider include, for example, an automobile manufacturer, a network service provider, an e-commerce provider, a mobile terminal seller or manufacturer, and the like, and any entity (corporation, organization, individual, etc.) may be a provider of the agent system.

The agent device 100 communicates with the agent server 200 via a network NW. The network NW includes, for example, some or all of the Internet, a cellular network, a Wi-Fi network, a wide area network (WAN), a local area network (LAN), a public line, a telephone line, a wireless base station, and the like. Various web servers 300 are connected to the network NW, and the agent server 200 or the agent device 100 can obtain web pages from the various web servers 300 via the network NW.

The agent device 100 interacts with the occupant of the vehicle M, transmits a voice from the occupant to the agent server 200, and presents an answer obtained from the agent server 200 to the occupant in the form of a voice output or an image display.

First Embodiment

[Vehicle]

Figure 2:
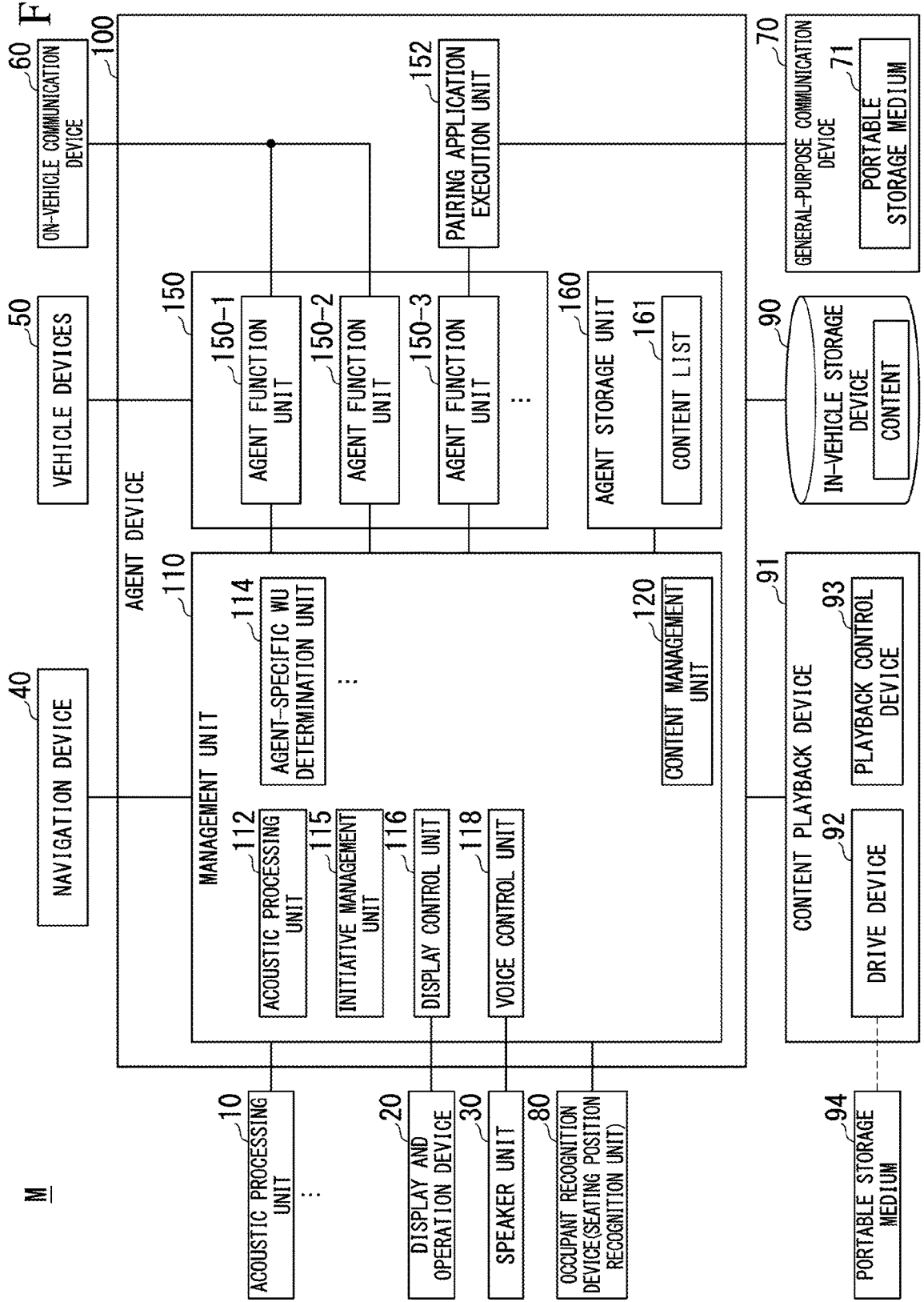
FIG. 2 is a diagram showing a configuration of an agent device according to a first embodiment and devices mounted in a vehicle.

FIG. 2 is a diagram showing a configuration of the agent device 100 according to a first embodiment and devices mounted in the vehicle M. For example, one or more microphones 10, a display and operation device 20, a speaker unit 30, a navigation device 40, vehicle devices 50, an on-vehicle communication device 60, an occupant recognition device 80, an in-vehicle storage device 90, a content playback device 91, and the agent device 100 are mounted in the vehicle M. A general-purpose communication device 70 such as a smartphone may be brought into a vehicle interior and used as a communication device. These devices are connected to each other by a multiplex communication line such as a controller area network (CAN) communication line, a serial communication line, a wireless communication network, or the like. The configuration shown in FIG. 2 is merely an example, and some of the constituents may be omitted or other constituents may be added.

The microphone 10 is a sound collection unit that collects a voice generated in the vehicle interior. The display and operation device 20 is a device (or a device group) that displays an image and can receive an input operation. The display and operation device 20 includes, for example, a display device formed as a touch panel. The display and operation device 20 may further include a head up display (HUD) or a mechanical input device. The speaker unit 30 includes, for example, a plurality of speakers (sound output units) arranged at different positions in the vehicle interior. The display and operation device 20 may be shared with the agent device 100 and the navigation device 40. Details of these will be described later.

The navigation device 40 includes a navigation human machine interface (HMI), a location positioning device such as a Global Positioning System (GPS) device, a storage device that stores map information, and a control device (a navigation controller) that performs a route search and the like. Some or all of the microphone 10, the display and operation device 20, and the speaker unit 30 may be used as the navigation HMI. The navigation device 40 searches for a route (a navigation route) for moving from a position of the vehicle M specified by the location positioning device to a destination input by the occupant and outputs guidance information using the navigation HMI so that the vehicle M can travel along the route. The route search function may be provided in a navigation server accessible via the network NW. In this case, the navigation device 40 acquires the route from the navigation server and outputs guidance information. The agent device 100 may be constructed on the basis of the navigation controller. In that case, the navigation controller and the agent device 100 are integrally formed on hardware.

The vehicle devices 50 include, for example, driving force output devices such as an engine and a traction motor, an engine starting motor, door lock devices, door opening and closing devices, windows, window opening and closing devices, window opening and closing control devices, seats, seat position control devices, a rearview mirror and its angular position control device, lighting devices inside and outside the vehicle and their control devices, wipers and defoggers and their control devices, direction indicators and their control devices, an air conditioner, a vehicle information device including information on mileage, tire pressure, a remaining fuel amount and the like, etc.

The on-vehicle communication device 60 is a wireless communication device that can access the network NW using a cellular network or a Wi-Fi network, for example.

The occupant recognition device 80 includes, for example, seating sensors, a vehicle interior camera, an image recognition device, and the like.

The seating sensors include pressure sensors provided below the seats, tension sensors attached to seat belts, and the like. The vehicle interior camera is a charge coupled device (CCD) camera or a complementary metal oxide semiconductor (CMOS) camera provided in the vehicle interior. The image recognition device analyzes an image obtained by the vehicle interior camera and recognizes presence or absence of an occupant for each seat, face orientation thereof, and the like. In the present embodiment, the occupant recognition device 80 is an example of a seating position recognition unit.

The in-vehicle storage device 90 is, for example, a storage device such as a hard disk drive (HDD) or a flash memory and is installed in the vehicle M. The in-vehicle storage device 90 stores, for example, content. The content is content that can be played back by the content playback device. The content may be music, movies, videos, or the like.

The content playback device 91 includes a content HMI, a drive device 92, and a playback control device 93 that performs playback of the content. Some or all of the microphone 10, the display and operation device 20, and the speaker unit 30 may be used as the content HMI. The drive device 92 is a device to which a portable storage medium 94 is attached and which acquires various information including the content from the portable storage medium 94. The portable storage medium 94 is, for example, a compact disc (CD), a digital versatile disc (DVD), or a secure digital (SD) card.

The playback control device 93 reads out the content stored in the in-vehicle storage device 90, controls the display and operation device 20 and the speaker unit 30, and plays back the read content.

The playback control device 93 may play back the content read from the portable storage medium 94 by the drive device 92 and may play back the content read from the portable storage medium 71 of the general-purpose communication device 70. When the content is read from the portable storage medium 71 of the general-purpose communication device 70 and played back, the playback control device 93 may acquire the content from the general-purpose communication device 70 via agent function units 150-2 and 150-3. When the content is acquired from the agent server 200 via the on-vehicle communication device 60 by an agent function unit 150, the playback control device 93 may play back the acquired content.

The playback control device 93 may communicate with a music player or the like brought by the occupant into the vehicle in a wired or wireless manner and play back the content read from the music player. In this case, the music player is also included in the portable storage medium brought into the vehicle.

Figure 3:
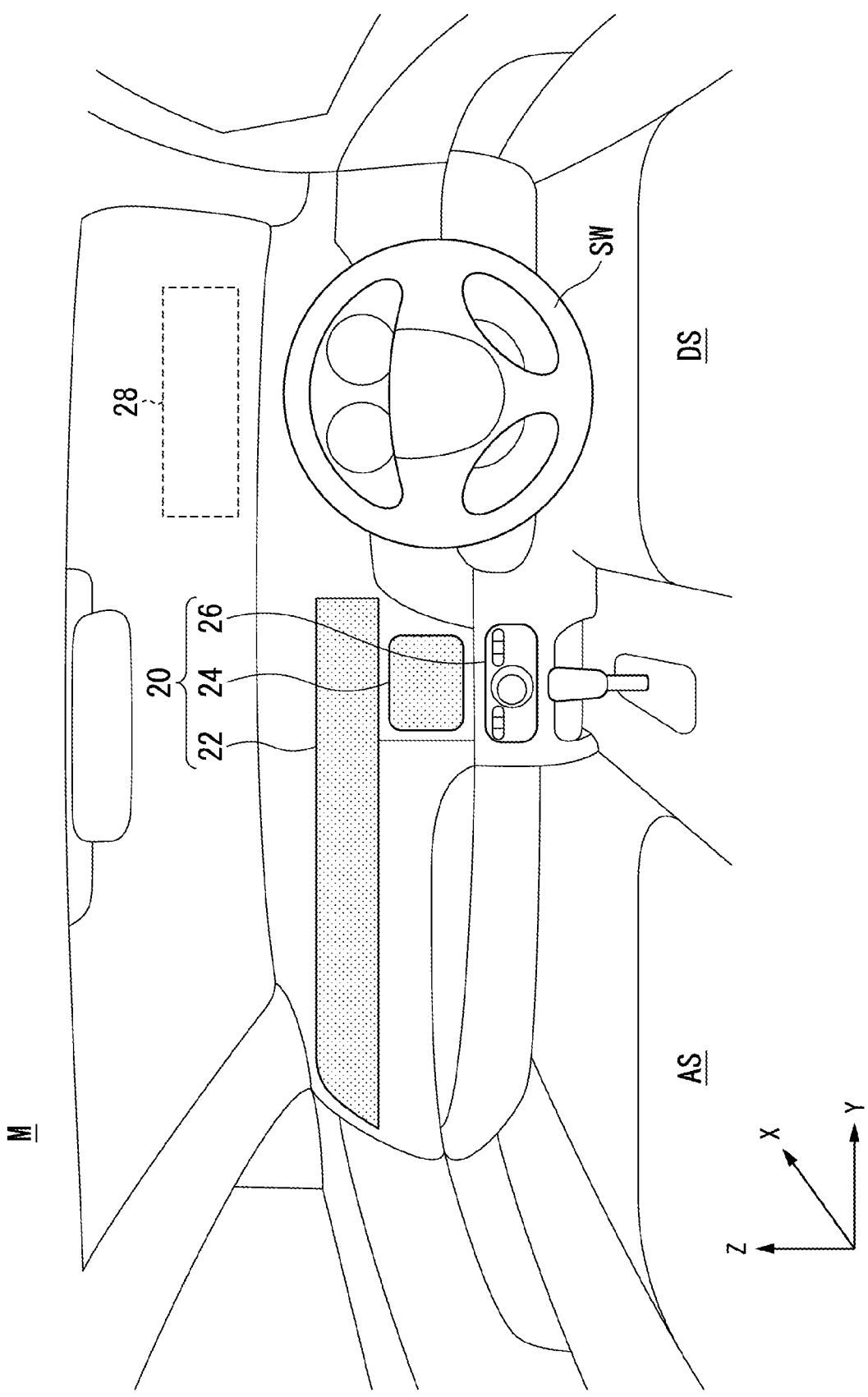
FIG. 3 is a diagram showing an arrangement example of a display and operation device.

FIG. 3 is a diagram showing an arrangement example of the display and operation device 20. The display and operation device 20 includes, for example, a first display 22, a second display 24, and an operation switch ASSY26. The display and operation device 20 may further include a HUD 28.

For example, there are a driver seat DS provided with a steering wheel SW and a passenger seat AS provided in a vehicle width direction (a Y direction in the figure) with respect to the driver seat DS in the vehicle M. The first display 22 is a horizontally elongated display device that extends from around a midpoint between the driver seat DS and the passenger seat AS on an instrument panel to a position facing a left end portion of the passenger seat AS.

The second display 24 is provided at an intermediate position between the driver seat DS and the passenger seat AS in the vehicle width direction and below the first display. For example, each of the first display 22 and the second display 24 is configured of a touch panel and includes a liquid crystal display (LCD), an organic electroluminescence (EL) display, a plasma display, or the like as a display unit. The operation switch ASSY 26 is a switch in which a dial switch, a button switch, and the like are integrated with each other. The display and operation device 20 outputs content of an operation performed by the occupant to the agent device 100. The content displayed on the first display 22 or the second display 24 may be determined by the agent device 100.

Figure 4:
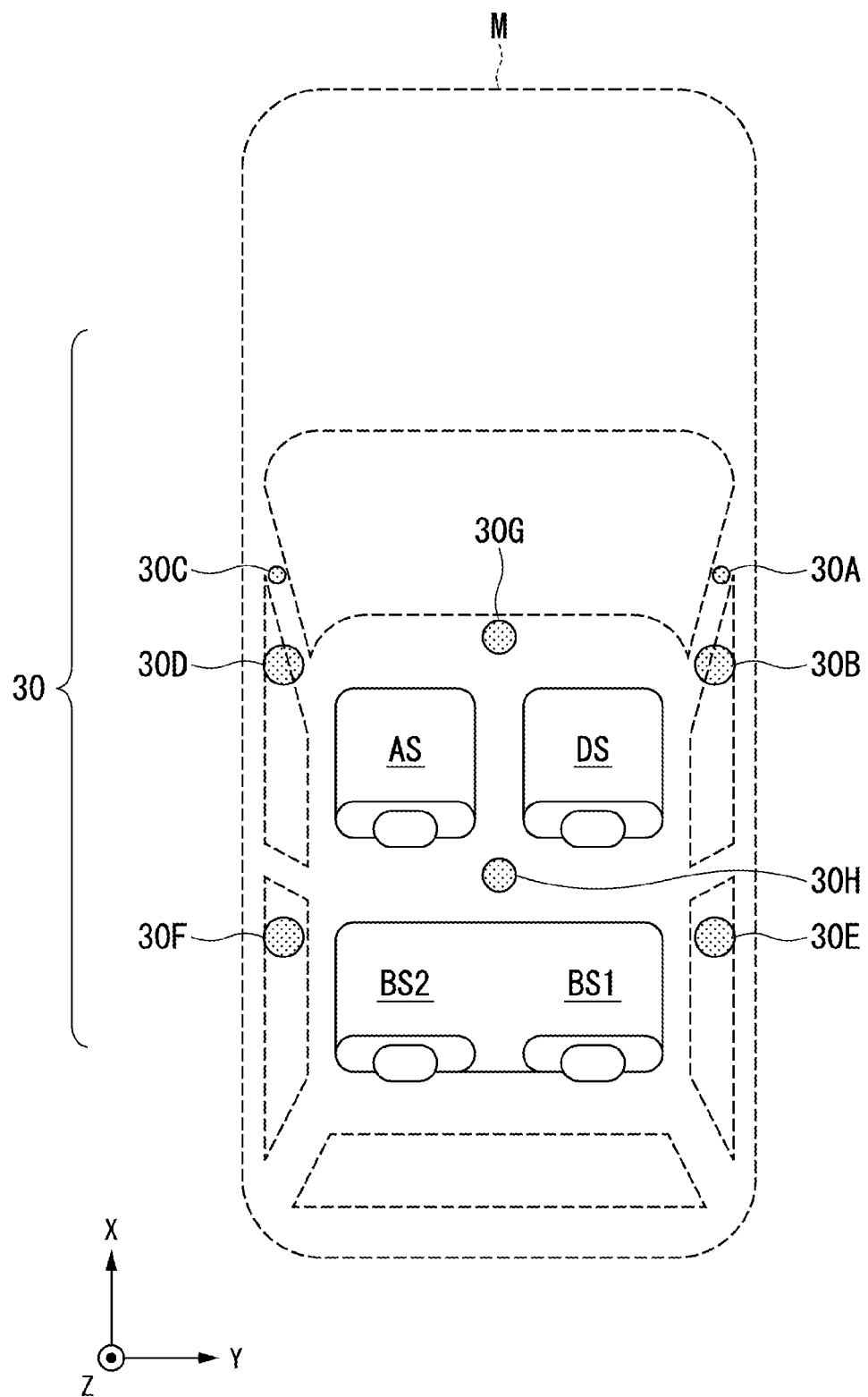
FIG. 4 is a diagram showing an arrangement example of a speaker unit.

FIG. 4 is a diagram showing an arrangement example of the speaker unit 30. The speaker unit 30 includes, for example, speakers 30A to 30H. The speaker 30A is installed on a window post (a so-called A pillar) on the driver seat DS side. The speaker 30B is installed below a door near the driver seat DS. The speaker 30C is installed on a window post on the passenger seat AS side. The speaker 30D is installed below a door near the passenger seat AS. The speaker 30E is installed below a door near a right rear seat BS1. The speaker 30F is installed below a door near a left rear seat BS2. The speaker 30G is installed near the second display 24. The speaker 30H is installed on a ceiling (a roof) of the vehicle interior.

In such an arrangement, for example, when sound is exclusively output from the speakers 30A and 30B, a sound image is localized near the driver seat DS. When sound is exclusively output from the speakers 30C and 30D, a sound image is localized near the passenger seat AS. When sound is exclusively output from the speaker 30E, a sound image is localized near the right rear seat BS1. When sound is exclusively output from the speaker 30F, a sound image is localized near the left rear seat BS2. When sound is exclusively output from the speaker 30G, a sound image is localized near a front side of the vehicle interior. When the sound is exclusively output from the speaker 30H, a sound image is localized near an upper side of the vehicle interior. The speaker unit 30 is not limited to the above and can localize a sound image at an arbitrary position in the vehicle interior by adjusting distribution of sound output from each speaker using a mixer or an amplifier.

[Agent Device]

Returning to FIG. 2, the agent device 100 includes a management unit 110, agent function units 150-1, 150-2, and 150-3, a pairing application execution unit 152, and an agent storage unit 160. The management unit 110 includes, for example, an acoustic processing unit 112, an agent-specific wake-up (WU) determination unit 114, an initiative management unit 115, a display control unit 116, a voice control unit 118, and a content management unit 120. When it is unnecessary to distinguish which agent function unit is referred to, the agent function units are simply referred to as the agent function unit 150. Illustration of the three agent function units 150 is merely an example corresponding to the number of agent servers 200 in FIG. 1, and the number of the agent function units 150 may be two or four or more. The arrangement of software shown in FIG. 2 is simply shown for explanation, and in reality, it can be arbitrarily modified, for example, such that the management unit 110 may be interposed between the agent function unit 150 and the on-vehicle communication device 60.

Each component of the agent device 100 is realized, for example, by a hardware processor such as a central processing unit (CPU) executing a program (software). Some or all of these components may be realized by hardware such as a large scale integration (LSI), an application specific integrated circuit (ASIC), a field-programmable gate array (FPGA), a graphics processing unit (GPU), etc., and may be realized by software and hardware in cooperation. The program may be stored in advance in a storage device (a storage device having a non-transitory storage medium) such as a hard disk drive (HDD) and a flash memory, and may be stored in a removable storage medium (non-transitory storage medium) such as a DVD or a CD-ROM and installed by attaching the storage medium to a drive device.

The management unit 110 functions by executing a program such as an operating system (OS) or middleware.

The acoustic processing unit 112 of the management unit 110 performs acoustic processing on an input sound so that it is in a state suitable for recognizing a predetermined wake-up word for each agent.

The agent-specific WU determination unit 114 is provided for each of the agent function units 150-1, 150-2, and 150-3 and recognizes the predetermined wake-up word for each agent. The agent-specific WU determination unit 114 recognizes a meaning of a voice from the voice (a voice stream) on which the acoustic processing has been performed. First, the agent-specific WU determination unit 114 detects a voice section on the basis of amplitude and zero crossing of a voice waveform in the voice stream. The agent-specific WU determination unit 114 may perform section detection based on voice identification and non-voice identification for each frame unit based on a Gaussian mixture model (GMM).

Next, the agent-specific WU determination unit 114 converts the voice in the detected voice section into text to generate text information. Then, the agent-specific WU determination unit 114 determines whether or not the text information of the text corresponds to the wake-up word. When it is determined as the wake-up word, the agent-specific WU determination unit 114 notifies the initiative management unit 115 that the wake-up word of the corresponding agent function unit 150 has been uttered.

The agent server 200 may have a function corresponding to the agent-specific WU determination unit 114. In this case, the management unit 110 transmits the voice stream on which the acoustic processing has been performed by the acoustic processing unit 112 to the agent server 200, and when the agent server 200 determines that it is the wake-up word, notifies the initiative management unit 115 in accordance with an instruction from the agent server 200 that the wake-up word of the corresponding agent function unit 150 has been uttered. Each of the agent function units 150 may be one that is always activated and determines by itself whether or not it corresponds to the wake-up word. In this case, the management unit 110 does not need to include the agent-specific WU determination unit 114.

The initiative management unit 115 manages the initiative set in any of the plurality of agent function units 150. For example, when the wake-up word is uttered, the initiative management unit 115 is notified of that fact from the agent-specific WU determination unit 114 or the like and sets the initiative to the agent function unit 150 corresponding to the wake-up word. Then, the initiative management unit 115 activates the agent function unit 150 to which the initiative is set. The activated agent function unit 150 provides a service via the agent, and when the provision ends, returns the initiative to the initiative management unit 115. After the initiative is returned, the active agent function unit 150 automatically stops itself. Then, when the initiative is returned, the initiative management unit 115 cancels setting of the initiative. As a result, no initiative is set in any of the agent function units 150. In the state in which no initiative is set in any of the agent function units 150, the initiative management unit 115 can set the initiative to the next agent function unit 150. That is, when the initiative is not returned from the agent function unit 150, the initiative management unit 115 cannot change setting of the initiative.

Switching of the initiative is not limited to the returning of the initiative by the agent function unit 150. For example, when provision of a service via the agent ends, the agent function unit 150 notifies the initiative management unit 115 of the end. Then, when notified of the end, the initiative management unit 115 may cancel setting of the initiative.

The setting of the initiative by the initiative manager 115 is not limited to ones based on the wake-up word. For example, the initiative management unit 115 may have a voice recognition function, and when it is recognized that a predetermined instruction has been given by the occupant, determine the agent function unit 150 to which the initiative is set in accordance with the instruction of the occupant or a situation in the vehicle, and set the initiative to the determined agent function unit 150. For example, when a control instruction (for example, temperature adjustment or the like) to the vehicle devices 50 is uttered by the occupant, the initiative management unit 115 may perform voice recognition of the uttered content and set the initiative to the agent function unit 150 to which authority for controlling the vehicle devices 50 is assigned. Also, in a case in which only an instruction is uttered without the wake-up word being uttered, when the instruction is a predetermined instruction, the initiative management unit 115 may determine the agent function unit 150 to which the initiative is set and set the initiative to the determined agent function unit 150.

The predetermined instruction is not limited to the above, and includes, for example, an instruction to play back the content. This will be described in detail later.

Stoppage of the agent function unit 150 may be a transition to a sleep mode or a transition to an end mode. The sleep mode is a state in which the agent function unit 150 is activated, and a state in which the agent function can be immediately executed in response to the utterance of the wake-up word from the occupant. The end mode is a state in which the agent has not been started, and a state in which the agent can be started by a start instruction (including a start instruction by utterance, a start operation via an operation unit, and the like) by the occupant.

Also, the agent function unit 150 is not limited to the above, and may always be activated regardless of whether the initiative is set or not. The initiative management unit 115 may control stoppage of the agent function unit 150 to which no initiative is set. The initiative management unit 115 cannot control stoppage of the agent function unit 150 to which the initiative is set.

The agent function unit 150 cooperates with the corresponding agent server 200 to cause the agent to virtually appear and provides a service including a voice response in response to the utterance of the occupant of the vehicle.

The agent function unit 150 may include one to which authority for controlling in-vehicle equipment is assigned. For example, the authority for controlling in-vehicle equipment is assigned to the agent function unit 150-1. The in-vehicle equipment includes, for example, the microphone 10, the display and operation device 20, the speaker unit 30, the vehicle devices 50, the content playback device 91, and the like. That is, the agent function unit 150-1 mainly functions as an in-vehicle agent that receives control of the in-vehicle equipment from an occupant. For example, the agent function unit 150-1 plays back the content read from the in-vehicle storage device 90. The agent function unit 150-1 communicates with the agent server 200-1 via the on-vehicle communication device 60.

The agent function unit 150 may include, among the in-vehicle equipment, that to which authority for controlling devices related to content playback is assigned. For example, the authority for controlling devices related to the content playback is assigned to the agent function unit 150-2. Devices related to the content playback include, for example, the display and operation device 20, the speaker unit 30, the content playback device 91, and the like. The agent function unit 150-2 communicates with the agent server 200-2 via the on-vehicle communication device 60. For example, the agent function unit 150-2 controls the devices related to the content playback included in the vehicle devices 50 and plays back the content received from the agent server 200-2.

The agent function unit 150 may include one that communicates with the agent server 200 in cooperation with the general-purpose communication device 70 via the pairing application execution unit 152. For example, the agent function unit 150-3 communicates with the agent server 200-3 in cooperation with the general-purpose communication device 70 via the pairing application execution unit 152. For example, authority for controlling the devices related to the content playback included in the general-purpose communication device 70 either alone or in cooperation with the general-purpose communication device 70 is assigned to the agent function unit 150-3.

The agent function unit 150-1 may control stoppage of the other agent function units 150-2 and 150-3 to which no initiative is set. For example, when the content management unit 120 determines that the content instructed by the utterance of the occupant is stored in the in-vehicle storage device 90 (or the portable storage medium 94 and 71), the other agent function units 150-2 and 150-3 may be stopped.

The pairing application execution unit 152 performs pairing with the general-purpose communication device 70 using, for example, Bluetooth (registered trademark) and connects the agent function unit 150-3 with the general-purpose communication device 70. The agent function unit 150-3 may be connected to the general-purpose communication device 70 by wired communication using a Universal Serial Bus (USB) or the like.

Hereinafter, an agent that the agent function unit 150-1 and the agent server 200-1 cause to virtually appear in cooperation is referred to as an agent 1. An agent that the agent function unit 150-2 and the agent server 200-2 cause to virtually appear in cooperation is referred to as an agent 2. An agent that the agent function unit 150-3 and the agent server 200-3 cause to virtually appear in cooperation is referred to as an agent 3. Wake-up words for the agents 1 to 3 are, for example, agents 1 to 3, respectively.

The display control unit 116 causes the first display 22 or the second display 24 to display an image related to the agent in response to an instruction from the agent function unit 150. Hereinafter, it is assumed that the first display 22 is used. The display control unit 116 generates, for example, an anthropomorphic agent image (hereinafter referred to as an agent image) that communicates with the occupant in the vehicle interior under control of a part of the agent function unit 150, and causes the first display 22 to display the generated agent image. The agent image is, for example, an image that appears to talk to the occupant. The agent image may include, for example, at least a face image to the extent that an expression and a face direction thereof are recognized by a viewer (occupant). For example, the agent image may be an image in which parts simulating eyes and a nose are represented in a face area, and the expression and the face direction are recognized on the basis of positions of the parts in the face area. The agent image may be an image which is perceived three-dimensionally and includes an image of a head in a three-dimensional space to allow the viewer to recognize the face direction of the agent, or may be an image which includes an image of a body (a trunk and limbs) to allow the viewer to recognize motion, behavior, posture, and the like of the agent. The agent image may be an animation image. The image related to the agent may include icon images representing services provided by the agent, text information representing content of the services provided by the agent, and the like.

The voice control unit 118 causes some or all of the speakers included in the speaker unit 30 to output a voice in accordance with an instruction from the agent function unit 150. The voice control unit 118 may use the plurality of speaker units 30 to perform control to localize a sound image of the agent voice at a position corresponding to a display position of the agent image. The position corresponding to the display position of the agent image is, for example, a position at which the occupant is expected to feel that the agent image is speaking the agent voice, and specifically a position near the display position of the agent image (for example, within 2 to 3 [cm]). Localizing the sound image refers to, for example, determining a spatial position of a sound source felt by the occupant by adjusting loudness of a sound transmitted to left and right ears of the occupant.

[Agent Server]

Figure 5:
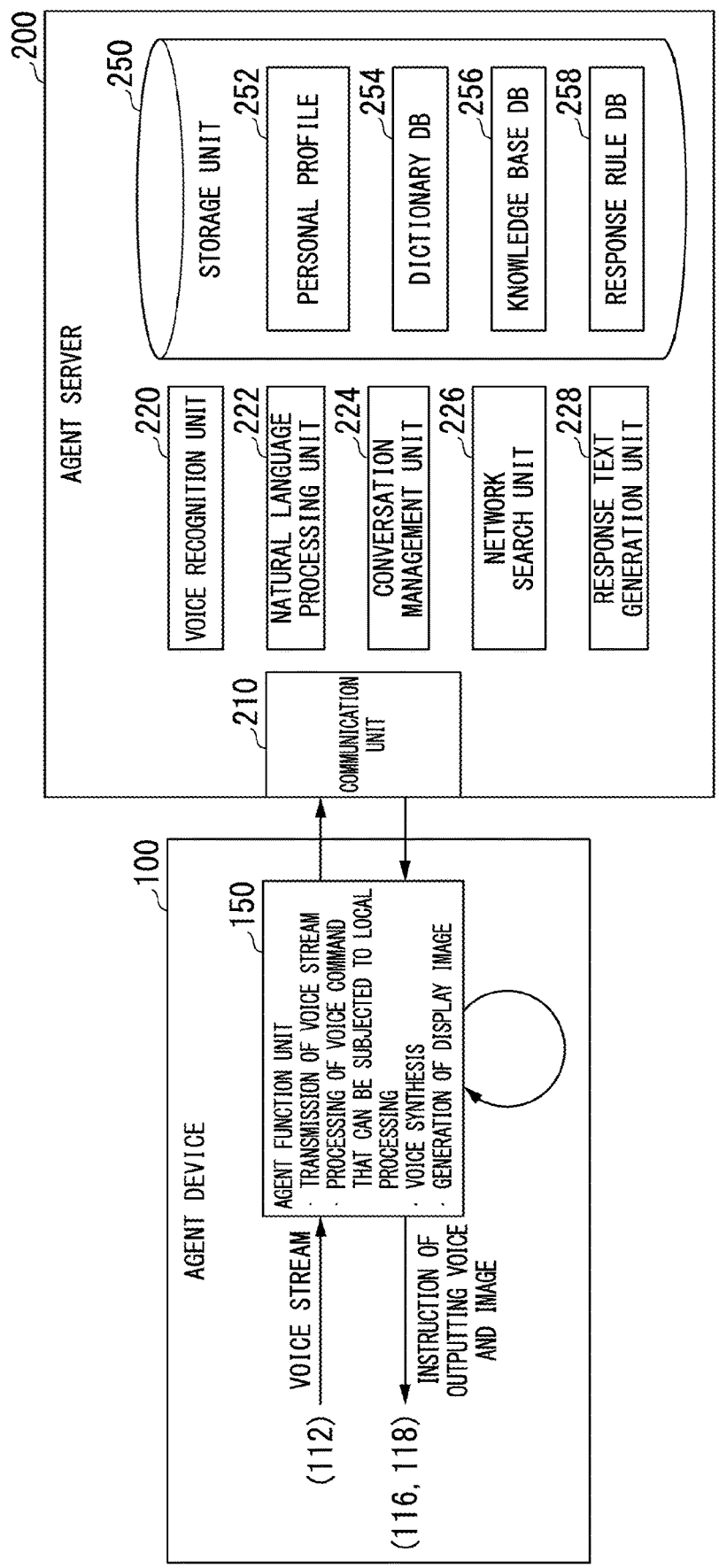
FIG. 5 is a diagram showing a configuration of an agent server and a part of a configuration of the agent device.

FIG. 5 is a diagram showing a configuration of the agent server 200 and a part of a configuration of the agent device 100. Hereinafter, an operation of the agent function unit 150 and the like will be described together with the configuration of the agent server 200. Here, description of physical communication from the agent device 100 to the network NW will be omitted.

The agent server 200 includes a communication unit 210. The communication unit 210 is a network interface such as a network interface card (NIC). Further, the agent server 200 includes, for example, a voice recognition unit 220, a natural language processing unit 222, a conversation management unit 224, a network search unit 226, and a response text generation unit 228. These components are realized, for example, by a hardware processor such as a CPU executing a program (software). Some or all of these components may be realized by hardware (a circuit unit; including circuitry) such as an LSI, an ASIC, an FPGA, and a GPU, and may be realized by software and hardware in cooperation.

The program may be stored in a storage device such as an HDD or a flash memory (a storage device having a non-transitory storage medium) in advance, or may be stored in a removable storage medium (non-transitory storage medium) such as a DVD or a CD-ROM and installed by attaching the storage medium to a drive device.

The agent server 200 includes a storage unit 250. The storage unit 250 is realized by any of various storage devices described above. The storage unit 250 stores data and programs such as a personal profile 252, a dictionary database (DB) 254, a knowledge base DB 256, and a response rule DB 258.

In the agent device 100, the agent function unit 150 transmits an audio stream or an audio stream that has undergone processing such as compression or encoding to the agent server 200.

For example, when a voice command which can be subjected to local processing (processing not involving the agent server 200) is recognized, the agent function unit 150 may perform processing requested by the voice command. The voice command which can be subjected to local processing is a voice command that can be answered by referring to the agent storage unit 160 included in the agent device 100, and in the case of the agent function unit 150-1, is a voice command for controlling the vehicle devices 50 (for example, a command to turn on the air conditioner). Therefore, the agent function unit 150 may have some of the functions of the agent server 200.

When the voice stream is acquired, the voice recognition unit 220 performs voice recognition and outputs text information converted into text, and the natural language processing unit 222 performs semantic interpretation on the text information while referring to the dictionary DB 254. The dictionary DB 254 associates abstract semantic information with text information. The dictionary DB 254 may include list information of synonyms and similar words.

Steps of the processing of the voice recognition unit 220 and the processing of the natural language processing unit 222 are not clearly divided, and may be performed by interacting with each other, for example, the voice recognition unit 220 receives processing results of the natural language processing unit 222 and corrects recognition results.

For example, when a meaning such as "today's weather" or "how is the weather" is recognized as a recognition result, the natural language processing unit 222 generates a command replaced with standard text information "today's weather." As a result, even when a voice of a request has text variations, it is possible to easily perform the requested conversation. The natural language processing unit 222 may recognize a meaning of the text information using artificial intelligence processing such as machine learning processing using probability, or may generate a command based on the recognition result.

The conversation management unit 224 determines content of an utterance to the occupant of the vehicle M on the basis of the processing result (command) of the natural language processing unit 222 while referring to the personal profile 252, the knowledge base DB 256, and the response rule DB 258. The personal profile 252 includes personal information of the occupant, hobbies and preferences, a history of past conversations, and the like stored for each occupant. The knowledge base DB 256 is information that defines correlations between things. The response rule DB 258 is information that defines an operation (such as an answer or content of device control) to be performed by the agent for the command.

The conversation management unit 224 may specify the occupant by performing collation with the personal profile 252 using feature information obtained from a voice stream. In this case, in the personal profile 252, for example, personal information is associated with feature information of a voice. The feature information of the voice is, for example, information on features of how a speaker speaks such as voice pitch, intonation, and rhythm (pitch pattern of sound), and feature amounts such as Mel frequency cepstrum coefficients. The feature information of the voice is, for example, information obtained by having the occupant utter a predetermined word or sentence at the time of initial registration of the occupant and recognizing the uttered voice.

When the command requests information that can be searched for via the network NW, the conversation management unit 224 causes the network search unit 226 to perform searching. The network search unit 226 accesses the various web servers 300 via the network NW and acquires desired information. The "information that can be searched for via the network NW" is, for example, an evaluation result from a general user in a restaurant near the vehicle M, or may be a weather forecast in accordance with a position of the vehicle M on that day.

The response text generation unit 228 generates response text and transmits it to the agent device 100 such that content of an utterance determined by the conversation management unit 224 is transmitted to the occupant of the vehicle M. When the occupant is identified as an occupant registered in the personal profile, the response text generation unit 228 may call the name of the occupant or generate response text in a manner of speaking similar to that of the occupant.

When the response text is acquired, the agent function unit 150 instructs the voice control unit 118 to perform voice synthesis and output the voice. The agent function unit 150 instructs the display control unit 116 to display an image of the agent in accordance with a voice output. In this way, the agent function in which the virtually appearing agent responds to the occupant of the vehicle M is realized.

[Content Playback Control]

For example, it is assumed that a wakeup word of another agent function unit 150-1 is uttered during a period in which the agent function unit 150-3 is providing a service via the agent. Specifically, it is assumed that, when the agent function unit 150-3 cooperates with the agent server 200-3 and controls the content playback device 91 to play back music, the occupant utters "Agent 1, lower the temperature inside the vehicle!" In this case, since the initiative is set to the agent function unit 150-3, the agent function unit 150-1 cannot control the vehicle devices 50 until after the music being played ends and the initiative is returned to the initiative management unit 115.

Therefore, when playback of content is instructed by an utterance of the occupant, the initiative management unit 115 sets the initiative to the agent function unit 150-1 to which authority for controlling the vehicle devices 50 is assigned. Alternatively, the initiative management unit 115 suspends setting of the initiative. For example, when "Play OO" is uttered, the initiative management unit 115 suspends setting of the initiative.

Even when the occupant gives an instruction of playback of content including the wake-up word such as "Agent 3, play OO," the initiative management unit 115 may suspend setting of the initiative without setting the initiative to the agent function unit 150-3. In this way, it is possible to select to which agent function unit 150 the initiative is set in response to a predetermined instruction before the initiative is set.

The initiative management unit 115 determines whether or not playback of content has been instructed by the utterance of the occupant. For example, when the utterance matches "Play OO," "Turn on OO of OO," "Turn on music," etc., the initiative management unit 115 determines that playback of content has been instructed by the utterance of the occupant. The initiative management unit 115 may refer to a content list 161, and when the utterance of the occupant includes the title of a piece of music registered in advance in the content list 161, the initiative management unit 115 may determine that playback of content has been instructed by the utterance of the occupant. The initiative management unit 115 is not limited to the above and may request the agent function unit 150-1 to make this determination. When this determination is requested, the agent function unit 150-1 recognizes uttered content, for example, in cooperation with the agent server 200-1.

When the wake-up word is not included in the utterance of the occupant, the initiative management unit 115 may set the initiative to the agent function unit 150-1 to which authority for controlling the vehicle devices 50 is assigned, or may suspend setting of the initiative.

In the case in which playback of content is instructed by an utterance of the occupant, when the content instructed to be played back is present in the in-vehicle storage device 90, the content management unit 120 plays back the content present in the in-vehicle storage device 90 in the vehicle. For example, when playback of content is instructed by an utterance of the occupant, the content management unit 120 determines whether or not the instructed content is present in the in-vehicle storage device 90 or the portable storage medium 94 (or 71). For example, the content management unit 120 acquires a text word of a song title "Music 1" from content of an utterance, searches the content list 161 of the agent storage unit 160, and determines that the content that matches "Music 1" is stored. The content management unit 120 is not limited to the above, and may search the in-vehicle storage device 90, and when the content titled "Music 1" is obtained via the search, the content management unit 120 may determine that the content that matches "Music 1" is stored. The match includes an exact match and a partial match.

When the instructed content is present in the in-vehicle storage device 90 or the portable storage medium 94 (or 71), the content management unit 120 selects the content present in the in-vehicle storage device 90 or the portable storage medium 94 (or 71). When the initiative is suspended, the content management unit 120 selects the content present in the in-vehicle storage device 90 or the portable storage medium 94 (or 71), and then the initiative management unit 115 may set the initiative to the agent function unit 150-1.

Then, the content management unit 120 requests the agent function unit 150-1 to play back the selected content. The agent function unit 150-1 reads out content of the instructed content from the in-vehicle storage device 90 or the portable storage medium 94 (or 71), and, for example, controls the speaker unit 30 to play back the content. In this way, the agent for setting the initiative is selected by the initiative management unit 115 before the content is played back via the agents 2 and 3 to which the authority for controlling the vehicle devices 50 is not assigned.

The agent storage unit 160 is, for example, a storage device such as a flash memory. The agent storage unit 160 stores, for example, the content list 161. The content list 161 is information indicating a list of content titles stored in the in-vehicle storage device 90, for example. When content is added to the in-vehicle storage device 90, the content management unit 120 may add a title of the added content to the content list 161. The content management unit 120 may acquire the title of the content stored in the portable storage medium 94 (or 71) from the portable storage medium 94 (or 71) and add the title to the content list 161.

[Content Playback]

Hereinafter, content playback control executed in the agent device 100 will be described. An example in which each of the agent function units 150-1 to 150-3 executes content playback control will be described with reference to FIGS. 6 to 8. In this example, it is assumed that two contents "Music 1" and "Music 2" are stored in the in-vehicle storage device 90, and the portable storage medium 94 is not connected. "Music 1" and "Music 2" are song titles.

Figure 6:
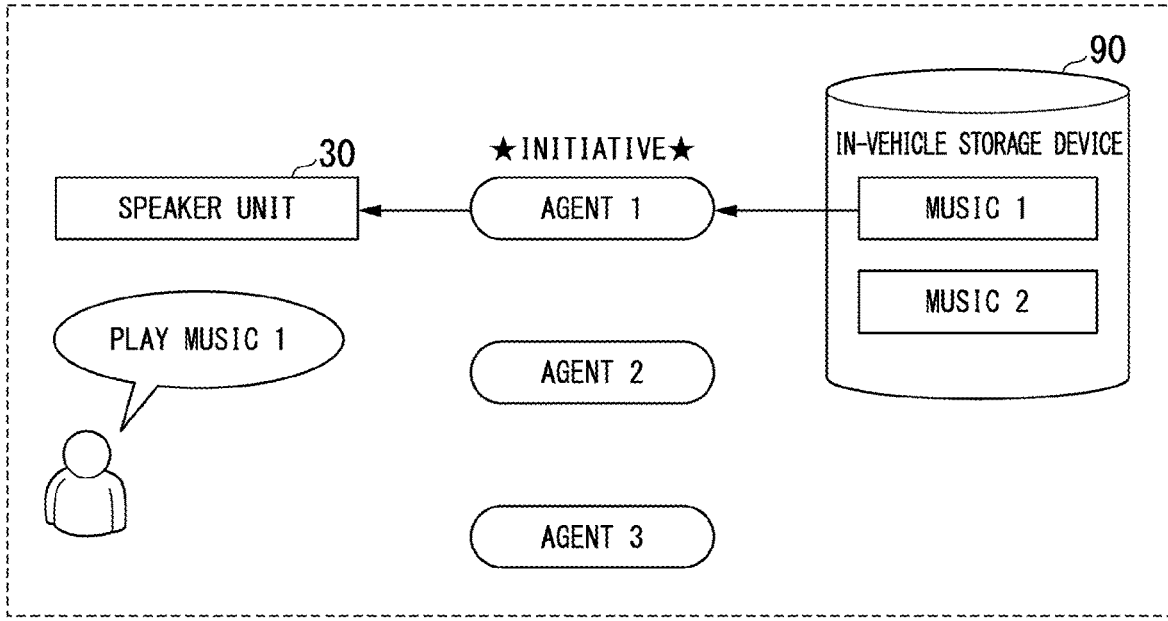
FIG. 6 is a reference diagram for illustrating an example in which an agent function unit executes content playback control.

FIG. 6 is a reference diagram for illustrating an example in which the agent function unit 150-1 executes content playback control. For example, it is assumed that the occupant utters "Play Music 1." In this way, when playback of content is instructed by an utterance of the occupant, the initiative management unit 115 may temporarily set the initiative to the agent function unit 150-1 or may suspend setting of the initiative.

The content management unit 120 refers to the content list 161 and determines whether or not "Music 1" is present in the in-vehicle storage device 90 or the like. In this example, since "Music 1" is present in the in-vehicle storage device 90, the content management unit 120 selects the content of "Music 1" stored in the in-vehicle storage device 90, and instructs the agent function unit 150-1 to play back the selected content. The agent function unit 150-1 reads out the content of "Music 1" from the in-vehicle storage device 90 and controls the speaker unit 30 and the like to play back the content.

Figure 7:
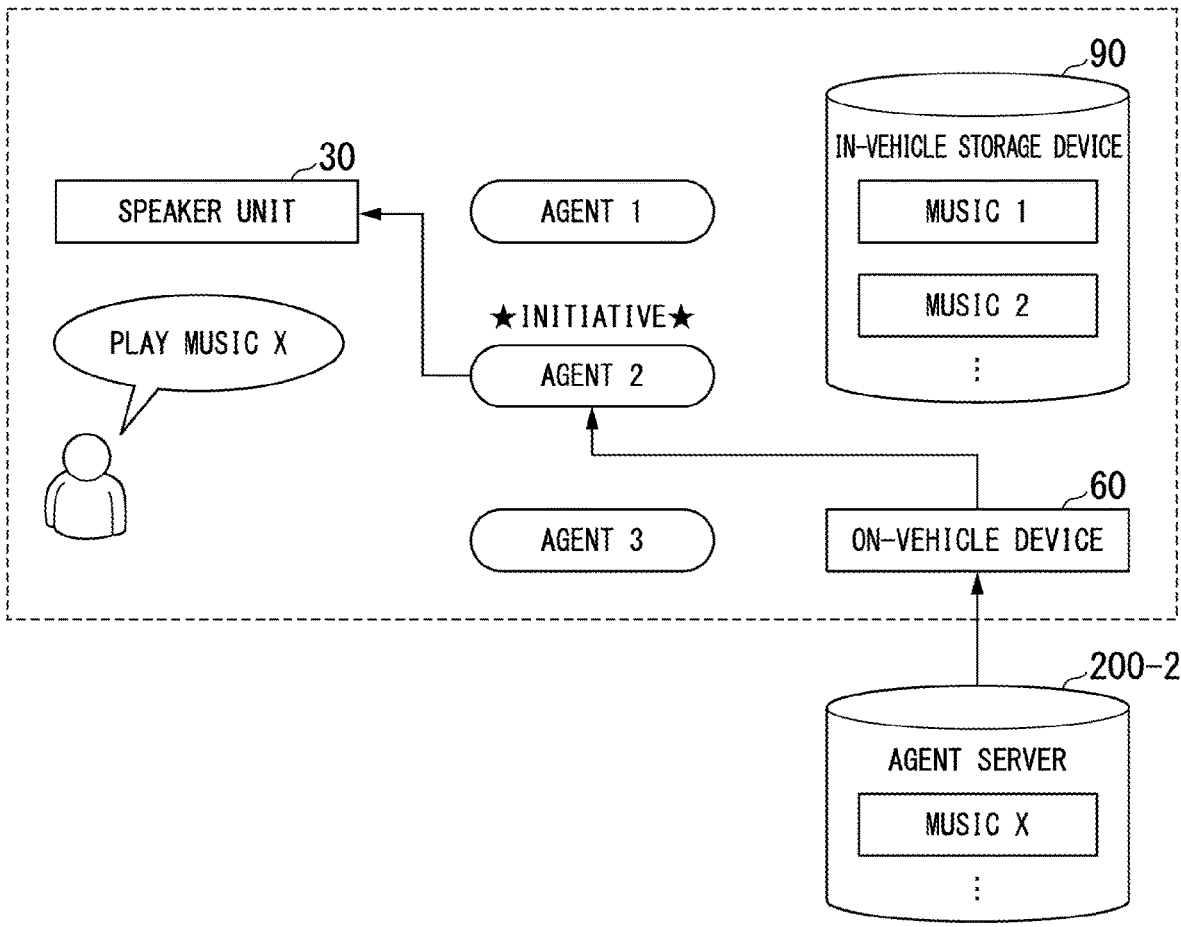
FIG. 7 is a reference diagram for illustrating an example in which an agent function unit executes content playback control.

FIG. 7 is a reference diagram for illustrating an example in which the agent function unit 150-2 executes content playback control. For example, it is assumed that the occupant utters "Play Music X." In this way, when playback of content is instructed by an utterance of the occupant, the initiative management unit 115 may temporarily set the initiative to the agent function unit 150-1 or may suspend setting of the initiative.

The content management unit 120 refers to the content list 161 and determines whether or not "Music X" is present in the in-vehicle storage device 90 or the like. In this example, since "Music X" is not present in the in-vehicle storage device 90, the initiative management unit 115 sets the initiative to the agent function unit 150-2. The agent function unit 150-2 cooperates with the agent server 200-2 to acquire content of "Music X" stored in the agent server 200-2 via the on-vehicle communication device 60 (by downloading or streaming), and controls the speaker unit 30 and the like and to play back the content.

Figure 8:
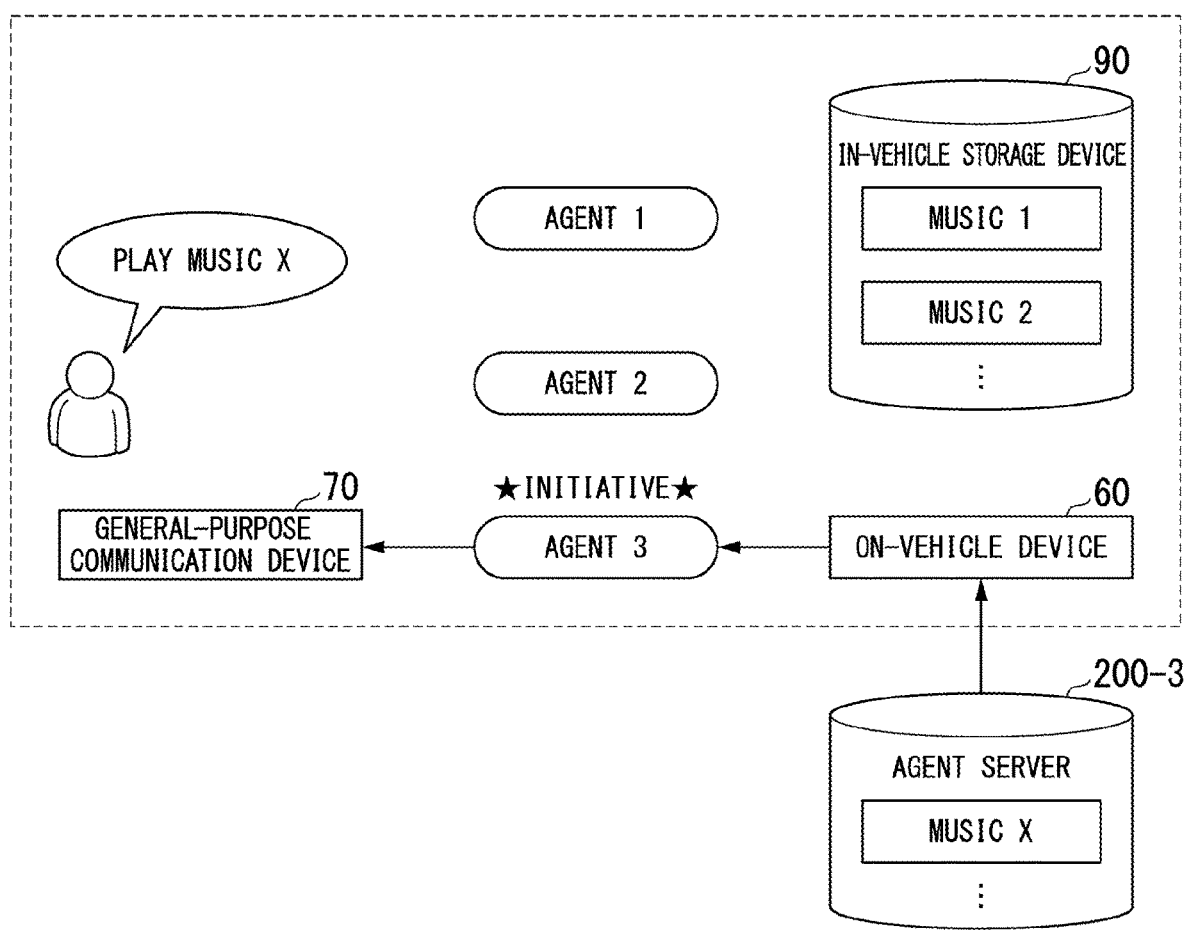
FIG. 8 is a reference diagram for illustrating an example in which an agent function unit executes content playback control.

FIG. 8 is a reference diagram for illustrating an example in which the agent function unit 150-3 executes content playback control. For example, it is assumed that the occupant utters "Play Music X." In this way, when playback of content is instructed by an utterance of the occupant, the initiative management unit 115 may temporarily set the initiative to the agent function unit 150-1 or may suspend setting of the initiative.

The content management unit 120 refers to the content list 161 and determines whether or not "Music X" is present in the in-vehicle storage device 90 or the like. In this example, since "Music X" is not present in the in-vehicle storage device 90, the initiative management unit 115 sets the initiative to the agent function unit 150-3. The agent function unit 150-3 cooperates with the general-purpose communication device 70 and the agent server 200-3 to acquire the content of "Music X" stored in the agent server 200-3 via the on-vehicle communication device 60 (by downloading or streaming), and controls the general-purpose communication device 70 to play back the content.

As described above, when the instructed content is present in the vehicle storage device 90 or the like, the content is selected and the agent function unit 150-1 serving as an in-vehicle agent plays back the content selected via the agent 1, and thus it is possible to prevent the initiative from being set in the agent function units 150-2 and 150-3 for a long time. Therefore, as in the example described above, even when the occupant utters "Agent 1, lower the temperature inside the car" during playback of content, the agent function unit 150-1 can control the vehicle devices 50 and lower the temperature inside the vehicle.

[Processing Flow]

Figure 9:
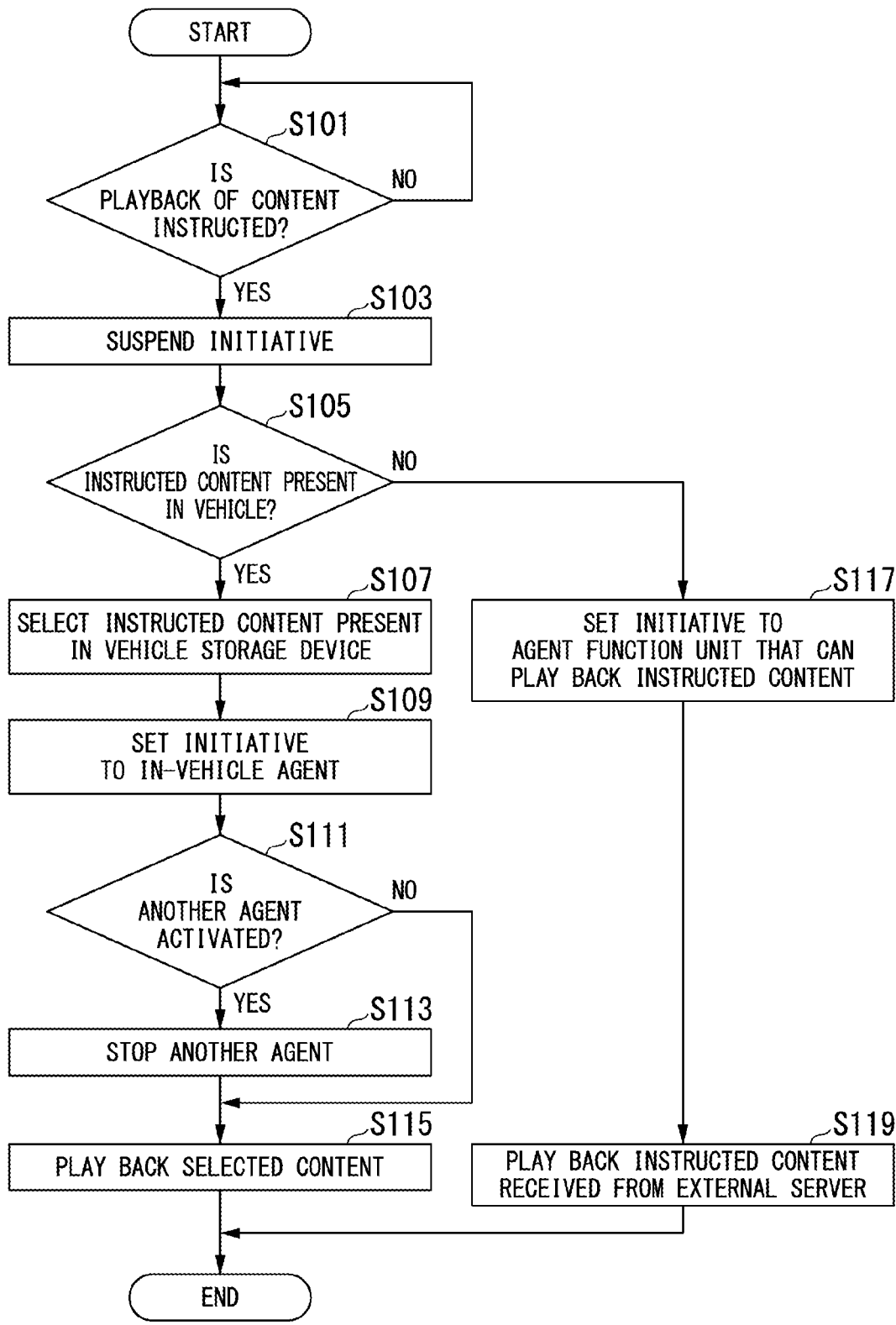
FIG. 9 is a flowchart showing an example of a process performed by the agent device.

Hereinafter, processing by the agent device 100 will be described. FIG. 9 is a flowchart showing an example of a process performed by the agent device 100. First, the initiative management unit 115 determines whether or not playback of content has been instructed (step S101). When playback of content is instructed, the initiative management unit 115 suspends the initiative (step S103).

Next, the content management unit 120 determines whether or not the instructed content is present in the in-vehicle storage device 90 or the portable storage media 94 and 71 (step S105). When the instructed content is present in the in-vehicle storage device 90 or the portable storage media 94 and 71, the content management unit 120 selects the content present in the in-vehicle storage device 90 or the portable storage media 94 and 71 (step S107). Then, the initiative management unit 115 sets the initiative to the agent function unit 150-1 (in-vehicle agent) (step S109).

Next, the initiative management unit 115 determines whether or not the agent function units 150-2 and 150-3 to which no initiative is set are activated (step S111). When the agent function units 150-2 and 150-3 are activated, the initiative management unit 115 stops the activated agent function units 150-2 and 150-3 (step S113). The process of step S113 may be executed by the agent function unit 150-1. In the process of step S113, the initiative management unit 115 may notify the agent function units 150-2 and 150-3 other than the agent function unit 150-1 of the stoppage, and the agent function units 150-2 and 150-3 that have received the notification may stop themselves.

Then, the agent function unit 150-1 to which the initiative is set reads out content of the content selected by the content management unit 120 from the in-vehicle storage device 90 or the portable storage medium 94, 71, and, for example, controls the speaker unit 30 to play back the content (step S115).

On the other hand, in step S105, when the instructed content is not present in the in-vehicle storage device 90 or the portable storage media 94 and 71, the initiative management unit 115 sets the initiative to the agent function unit 150 which can play back the instructed content (step S117). For example, the initiative management unit 115 sets the initiative to the agent function unit 150-2.

Then, the agent function unit 150-2 cooperates with the agent server 200-2 to acquire the content stored in the agent server 200-2 (or another external server) via the on-vehicle communication device 60, and controls the speaker unit 30 and the like to play back the content (step S119).

According to the agent device 100 of the first embodiment described above, convenience can be improved.

As described above, although aspects for carrying out the present invention have been described using the embodiments, the present invention is not limited to such embodiments at all and various modifications and substitutions can be made without departing from the spirit of the present invention.

For example, although the content management unit 120 has been described as a functional unit included in the management unit 110 of the agent device 100, the present invention is not limited thereto. For example, the content management unit 120 may be configured to be included in the agent function unit 150, or may be installed in an in-vehicle device different from the agent device 100.

In the above example, although the example in which the initiative setting unit 115 controls activation of the agent function unit 150 has been described, the present invention is not limited thereto. For example, the agent function unit 150-1 serving as a vehicle agent may control setting of the initiative and activation of the other agent function units 150-2 and 150-3 from a standpoint of a master.

What is claimed is:

1. An on-vehicle device comprising:
a processor configured to:
instantiate a plurality of agent functions that provide services including causing output of an audio response in response to an utterance by an occupant of a vehicle, at least some of the agent functions providing a service of acquiring content from a server device outside the vehicle via wireless communication and causing play back of the content in response to the utterance of the occupant, at least one of the plurality of agent functions being realized in the on-vehicle device and the other agent functions of the plurality of agent functions being virtually realized by different server devices operated by different providers by a network;

determine whether or not the content is stored in an in-vehicle storage device mounted in the vehicle or a portable storage medium brought into the vehicle when the playback of the content is instructed by the utterance of the occupant, and to cause the play back of the content present in the in-vehicle storage device or the portable storage medium when the content is determined as being stored in the in-vehicle storage device or the portable storage medium; and set an initiative which is an authority to exclusively provide a service via an agent function of the plurality of agent functions to any of the plurality of agent functions, wherein, when the content is determined as being present in the in-vehicle storage device or the portable storage medium, the processor sets the initiative to the agent function to which the authority for controlling the vehicle devices mounted in the vehicle is assigned.

2. The on-vehicle device according to claim 1, wherein, when the processor determines that the content is not stored in the in-vehicle storage device or the portable storage medium, one of the plurality of agent functions acquires the content from the server device and causes the play back of the content.

3. The on-vehicle device according to claim 1, wherein, among the plurality of agent functions, the agent function to which the authority for controlling vehicle devices mounted in the vehicle is assigned causes the play back of the instructed content.

4. The on-vehicle device according to claim 1, wherein, when the processor determines that the content is stored in the in-vehicle storage device or the portable storage medium, an active agent function of the plurality of agent functions stops functioning.

5. The on-vehicle device according to claim 4, wherein, among the plurality of agent functions, the agent function to which the authority for controlling vehicle devices mounted in the vehicle is assigned or the processor which controls activation of the plurality of agent functions causes an active agent function of the plurality of agent functions to stop functioning.

6. A method of controlling an on-vehicle device in which a computer executes steps of:

causing a plurality of agents to virtually appear, the plurality of agents providing services including causing an output of an audio response in response to an utterance by an occupant of a vehicle, at least some of the agents providing a service of acquiring content from a server device outside the vehicle via wireless communication and causing a playback device to play back the content in response to the utterance of the occupant, at least one of the plurality of agents being realized in the on-vehicle device and the other agents of the plurality of agents being virtually realized by different server devices operated by different providers by a network;

determining whether or not the content is stored in an in-vehicle storage device mounted in the vehicle or a portable storage medium brought into the vehicle when the playback of the content is instructed by the utterance of the occupant;

causing the playback device to play back the content present in the in-vehicle storage device or the portable storage medium when the content is determined as being stored in the in-vehicle storage device or the portable storage medium; and setting an initiative which is an authority to exclusively provide a service via an agent of any of the plurality of agents, wherein, when the content is determined as being present in the in-vehicle storage device or the portable storage medium, setting the initiative to the agent of the plurality of agents to which the authority for controlling the vehicle devices mounted in the vehicle is assigned.

7. A non-transitory computer-readable storage medium storing a program which causes a computer to execute processes of:

causing a plurality of agents to virtually appear, the plurality of agents providing services including causing an output unit to output an audio response in response to an utterance of an occupant of a vehicle, at least some of the agents providing a service of acquiring content from a server device outside the vehicle via wireless communication and causing a playback device to play back the content in response to the utterance of the occupant, at least one of the plurality of agents being realized in the on-vehicle device and the other agents of the plurality of agents being virtually realized by different server devices operated by different providers by a network;

determining whether or not the content is stored in an in-vehicle storage device mounted in the vehicle or a portable storage medium brought into the vehicle when the playback of the content is instructed by the utterance of the occupant;

causing the playback device to play back the content present in the in-vehicle storage device or the portable storage medium when the content is determined as being stored in the in-vehicle storage device or the portable storage medium; and setting an initiative which is an authority to exclusively provide a service via an agent of any of the plurality of agents, wherein, when the content is determined as being present in the in-vehicle storage device or the portable storage medium, setting the initiative to the agent of the plurality of agents to which the authority for controlling the vehicle devices mounted in the vehicle is assigned.

* * * * *